United States Patent [19]

Cather, Jr.

[11] 4,311,316
[45] Jan. 19, 1982

[54] SHAFT SEAL AND METHOD

[75] Inventor: Douglas A. Cather, Jr., Gastonia, N.C.

[73] Assignee: Garlock Inc., Longview, Tex.

[21] Appl. No.: 179,957

[22] Filed: Aug. 21, 1980

Related U.S. Application Data

[63] Continuation-in-part of Ser. No. 89,281, Oct. 29, 1979, Pat. No. 4,274,641.

[51] Int. Cl.³ .................................................. F16J 15/32
[52] U.S. Cl. .......................................... 277/1; 277/153; 277/166; 277/228
[58] Field of Search .................... 277/1, 152, 153, 165, 277/166, DIG. 6, 227–229, 233; 29/527.1; 264/248, 260, 271, 275

[56] References Cited

U.S. PATENT DOCUMENTS

| | | | |
|---|---|---|---|
| 2,932,535 | 4/1960 | Peickii et al. | 277/152 X |
| 3,495,843 | 2/1970 | Andersen et al. | 277/153 X |
| 3,871,669 | 3/1975 | Repella | 277/153 X |
| 4,171,561 | 10/1979 | Bainard et al. | 29/527.1 |

FOREIGN PATENT DOCUMENTS

| | | | |
|---|---|---|---|
| 46-23681 | 7/1971 | Japan . | |
| 136136 | 2/1961 | U.S.S.R. | 277/153 |

*Primary Examiner*—Robert S. Ward, Jr.
*Attorney, Agent, or Firm*—Schovee & Boston

[57] ABSTRACT

A shaft seal 10 and method for use including an annular bore retention section 12 which includes a metal reinforcing shell 20 having a cylindrical portion and a radial flange; an annular flex section 16 comprised of axial flex section 28 and radial flex section 30; and a dual lip sealing element 14 comprised of primary sealing lip 32 and secondary sealing lip 34, both of said sealing lips being lined with a low-friction material such as, for example, polytetrafluoroethylene liner 42.

24 Claims, 1 Drawing Figure

U.S. Patent
Jan. 19, 1982
4,311,316
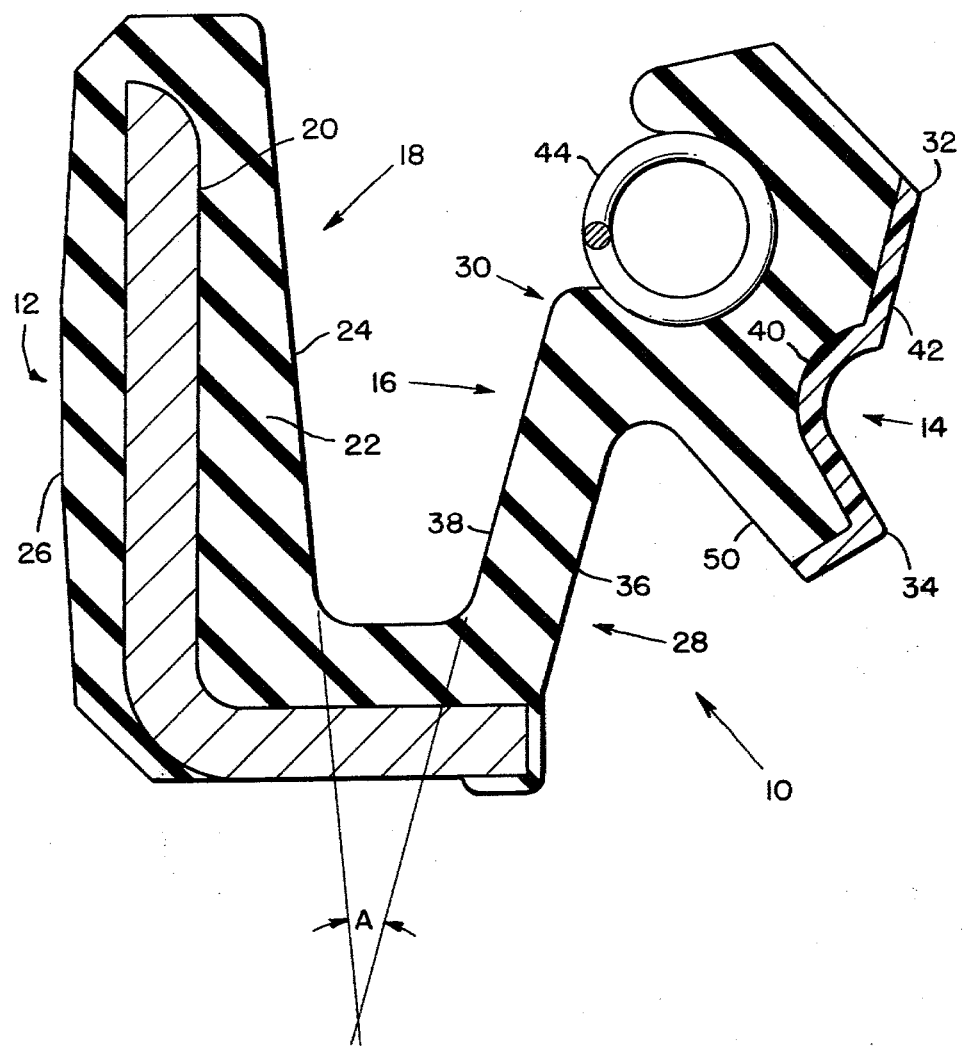

4,311,316

SHAFT SEAL AND METHOD

CROSS-REFERENCE TO RELATED APPLICATION

This application is a continuation-in-part of U.S. application Ser. No. 089,281 which was filed on Oct. 29, 1979, now U.S. Pat. No. 4,274,641.

TECHNICAL FIELD

This invention relates to a resin-lined dual lip shaft seal which contains an axial flex section and a radial flex section and to a method for sealing fluids.

BACKGROUND

Many prior art shaft seals have a sealing lip lined with a resin such as e.g., polytetrafluoroethylene. Methods are known for molding an annular lip type shaft seal of the type having an elastomeric body or seal element with a resin liner integrally molded therewith and bonded thereto. These methods include placing a resin washer, an elastomeric preform, and a metal shell in a mold and closing the mold. See, for example, Japanese patent publication Sho 46-23681 announced July 7, 1971 in the Japanese Patent Agency Patent Gazette.

Dual lip shaft seals are known to the art. Conventional dual lip seals have not been previously made with both lips lined during molding with polytetrafluoroehtylene using a single polytetrafluoroethylene disc. Because of the inner (holecut) diameter of the metal support shell and the mold configuration, the polytetrafluoroethylene disc was restricted from reforming downward into the secondary lip approach surface.

The unlined, secondary lip on conventional dual lip seals tended to quickly wear away to shaft size, and this worn secondary lip then became ineffective in protecting the primary lip and stabilizing the sealing element.

BRIEF SUMMARY OF THE INVENTION

The shaft seal and method of this invention solve the above-mentioned problems by providing a resin-lined, dual lip shaft seal with a flex section containing an axial flex portion and a radial flex portion. In the seal of this invention, the main sealing element and its flex section are isolated from the retention portion of the seal (which contains the metal support shell); and the axial and radial flex sections connect the main sealing element to the retention portion, allow for additional radial flexibility, and permit polytetrafluoroethylene to flow to both sealing lips during molding. Furthermore, unlike some prior art dual lip seals which have a convoluted flex section, the seal of this invention can be removed from the mold in a conventional manner without damaging it.

BRIEF DESCRIPTION OF THE DRAWING

The present invention will be more fully understood by reference to the following detailed description thereof, when read in conjunction with the attached drawing, wherein:

The FIGURE is a partial cross-sectional view through a seal according to the preferred embodiment of the present invention.

DETAILED DESCRIPTION OF THE INVENTION

With reference now to the drawing, the FIGURE shows a seal 10 according to one embodiment of the present invention. The seal 10 is shown in its as-molded or off-shaft configuration before it is placed on a shaft.

The seal 10 includes an annular bore retention section 12, annular sealing element 14, and an annular flex section 16. In one preferred embodiment, the two sections 12 and 16 and the sealing element 14 are integral parts of a unitary, molded elastomeric body 18.

In a preferred embodiment, bore retention section 12 includes metal reinforcing shell 20 having a cylindrical portion and a radial flange. Metal reinforcing shell 20 is bonded to the bore retention portion 22 of said elastomeric body 18. Elastomeric body bore retention section 22 includes inwardly facing wall 24 and outwardly facing wall 26.

Flex section 16 includes axial flex section 28 and radial flex section 30. Flex sections 28 and 30 allow for additional radial flexibility and permit a liner material such as polytetrafluoroethylene to be reformed from primary sealing lip 32 to secondary sealing lip 34 when seal 10 is being molded.

Flex section 28 includes inwardly facing wall 36 and outwardly facing wall 38. In one preferred embodiment, walls 36 and 38 are substantially parallel to each other.

Radial flex section 30 connects sealing element 14 with axial flex section 28.

In the as-molded condition of the seal of this invention, the axial flex section included angle is preferably acute. This angle, which is identified as angle A in the FIGURE, is the angle formed by the intersections of the extensions of walls 24 and 38.

Sealing element 14 includes primary sealing lip 32 and secondary sealing lip 34. Sealing lip 34 is spaced apart from sealing lip 32 by intermediate flex portion 40.

Sealing lip 32 is lined with a low-friction material such as, e.g. polytetrafluoroethylene liner 42. The inner diameter of liner 42 is molded at less than shaft size, and, because of its low friction characteristics, tends not to lose shaft contact due to wear. Intermediate flex section 40 and sealing lip 34 are also lined with low-friction material.

The low-friction lining material is a continuous member extending from at least the primary sealing lip 32 past the intermediate flex portion 40 to at least the secondary sealing lip 34; and it may extend past the primary and/or the secondary sealing lips. Thus, in the embodiment illustrated in the FIGURE, the liner 42 extends from sealing lip 32 to past sealing lip 34. In another embodiment, not shown, the liner extends from sealing lip 34 to past sealing lip 32. In another embodiment, not shown, the liner extends from sealing lip 32 to sealing lip 34. In yet another embodiment, not shown, the liner extends from past sealing lip 32 to past sealing lip 34.

Flex section 16 is preferably in the shape of one-half of an inverted V with the apex of the V pointing axially inwardly (the axially inward direction in the FIGURE is upward, as will be understood by any one skilled in this art, with lubricating fluid being located axially inwardly of the seal 10 and with the seal preventing the lubricating fluid from flowing in the downward direction in the FIGURE). The primary sealing lip 32 retains lubricant. The secondary sealing lip 34 excludes contaminants and also acts to stabilize the position of sealing element 14 with respect to the shaft during excessive runout of the shaft by keeping the sealing element from cocking. If secondary sealing lip 34 were to quickly wear away to shaft size, it would become ineffective in protecting primary lip 32 and in stabilizing the sealing element.

In one of the preferred embodiments of this invention, a seal with a case width of 0.500 inches and an outer diameter of 6.140 inches is prepared for use with a shaft with a diameter of 5.125 inches by placing a flat washer of sintered polytetrafluoroethylene, an elastomeric preform, and a metal shell into a cavity of an open compression mold and applying heat and pressure to produce the seal.

The shaft seal of this invention may also include a garter spring. Thus, in the embodiment illustrated in the FIGURE, garter spring 44 on sealing element 14 urges primary lip 32 radially inwardly.

The invention has been described in detail with particular reference to the preferred embodiments thereof, but it will be understood that variations and modifications can be effected within the spirit and scope of the invention as described hereinafter and as defined in the appended claims. For example, the present invention can be used in applications where, for example, there is a high speed relative rotation between the shaft and the housing and/or where there are high amounts of dynamic shaft runout. As stated above, other types and shapes of seal mounting sections and flex section can be used. The term "low friction bearing surface" means a surface having a lower coefficient of friction than the elastomeric body 18 itself.

The embodiments of this invention in which a particular property or privilege is claimed are as follows:

1. An annular shaft seal for sealing against the flow of fluid through an annular space between a bore of a housing and a shaft extending through the bore, comprising:
   (a) an annular bore retention section;
   (b) an annular sealing element which includes a primary sealing lip lined with low-friction material and a secondary sealing lip lined with low-friction material, said primary sealing lip being located axially inwardly of said secondary sealing lip and being adapted to sealingly contact a shaft extending through said seal; and
   (c) an annular flex section connecting said bore retention section to said sealing element and adapted to allow said sealing element to move freely radially with a shaft and relative to said bore retention section, said flex section including an axial flex section and a radial flex section.

2. The axial shaft seal as recited in claim 1, wherein said primary sealing lip is lined with polytetrafluoroethylene.

3. The axial shaft seal as recited in claim 2, wherein said secondary sealing lip is lined with polytetrafluoroethylene.

4. The axial shaft seal as recited in claim 3, wherein said bore retention section, said sealing element, and said flex section comprise a unitary, molded elastomeric body.

5. The axial shaft seal as recited in claim 4, wherein said annular bore retention section includes a metal reinforcing shell.

6. The axial shaft seal as recited in claim 5, further comprising a garter spring on said sealing element urging said primary lip radially inwardly.

7. The axial shaft seal as recited in claim 6, wherein said metal reinforcing shell includes a cylindrical portion and a radial flange.

8. The shaft seal as recited in claim 7, wherein said polytetrafluoroethylene liner continuously extends from at least said primary sealing lip to at least said secondary sealing lip.

9. Apparatus comprising a housing having a bore therethrough, a shaft extending through said bore, and the seal of claim 1 mounted in said bore and sealing against said shaft.

10. The apparatus as recited in claim 9, wherein said primary sealing lip is lined with polytetrafluoroethylene.

11. The apparatus as recited in claim 10, wherein said secondary sealing lip is lined with polytetrafluoroethylene.

12. The apparatus as recited in claim 11, wherein said bore retention section, said sealing element, and said flex section comprise a unitary, molded elastomeric body.

13. The apparatus as recited in claim 12, wherein said annular bore retention section includes a metal reinforcing shell.

14. The apparatus as recited in claim 13, wherein said seal further comprises a garter spring on said sealing element urging said primary lip radially inwardly.

15. The apparatus as recited in claim 14, wherein said metal reinforcing shell includes a cylindrical portion and a radial flange.

16. The apparatus as recited in claim 15, wherein said polytetrafluoroethylene liner continuously extends from at least said primary sealing lip to at least said secondary sealing lip.

17. The method for sealing against the flow of fluid through an annular space between a bore of a housing and a shaft extending through the bore, comprising the step of mounting in said bore the shaft seal of claim 1.

18. The method as recited in claim 17, wherein said primary sealing lip is lined with polytetrafluoroethylene.

19. The method as recited in claim 18, wherein said secondary sealing lip is lined with polytetrafluoroethylene.

20. The method as recited in claim 19, wherein said bore retention section, said sealing element, and said flex section comprise a unitary, molded elastomeric body.

21. The method as recited in claim 20, wherein said annular bore retention section includes a metal reinforcing shell.

22. The method as recited in claim 21, wherein said seal further comprises a garter spring on said sealing element urging said primary lip radially inwardly.

23. The method as recited in claim 22, wherein said metal reinforcing shell includes a cylindrical portion and a radial flange.

24. The method as recited in claim 23, wherein said polytetrafluoroethylene liner continuously extends from at least said primary sealing lip to at least said secondary sealing lip.

* * * * *